Patented Nov. 25, 1930

1,783,154

UNITED STATES PATENT OFFICE

JACOB SCHAUB, OF WESTFIELD, NEW JERSEY, ASSIGNOR TO BEST FOODS, INC., OF NEW YORK, N. Y., A CORPORATION OF NEW JERSEY

COLORING MATERIAL FOR OLEOMARGARINE, BUTTER, AND THE LIKE

No Drawing. Application filed July 6, 1925. Serial No. 41,872.

The object of my invention is to provide a coloring material for oleomargarine and butter and the like that may be marketed and put up for use in dry form.

Until recently a colored oil put up in capsule or bottles has been given to the consumer to be worked into the oleomargarine, usually a capsule, or capsules, containing sufficient amount to color the bulk of oleomargarine as sold to the customer. There are many objections to the use and handling of the gelatin capsule.

First, it is very susceptible to water or moisture and when placed in the package of oleomargarine which contains a considerable amount of water, the capsule softens, swells, and often bursts open, causing a disagreeable mess of the highly concentrated oil color. Then again, a capsule being necessarily in bulky form cannot be conveniently wrapped and dispensed with the oleomargarine.

By my invention I have provided a dry coloring material that contains no free oil, which can be readily handled and dispensed in flat packages, and especially, enveloped in water-proof material, such as celluloid and thus enable the seller of the oleomargarine to enclose a unit of color powder in every unit of oleomargarine sold.

In making the coloring powder, I use the customary aniline dyes known as benzenazo-b-naphthylanine and ortho-toluenzao-b-naphthylanine, commonly known as AB and OB, respectively. Vegetable coloring dyes, such as Arnotto seed, may also be used. The desired combination of dry colors is dissolved in a suitable volatile solvent, such as acetone, dichlorethylene, trichlorethylene, ethyl-ketone, and others. Any solvents that will not leave any odors on evaporation are preferred. The solutions are made in such proportions as will give the desired strength of color which is usually determined by the comparison of a standard strength solution with the colorimeter. These dyes are used in varying proportions to produce any tint desired. The colored liquid solution is added to a quantity of starch or other suitable material, and the mixture is thoroughly agitated, the aim being to coat the particles of starch or other material with the solution of color. As soon as this has been accomplished uniformly, the solvent of the color is evaporated by continued agitation and turning over of the mass or other suitable means. This operation may be carried out in a suitable closed container, which may be heated, the solvent driven off, collected, and condensed in a suitable condenser so that it may be used again.

The aim of the operation is to give a dry color coat to the starch granules in such a manner that they will not be matted together, but that the mass will be in true granular form.

In the act of using the colored powder for coloring, the following probably occurs: The coloring matter is held on the outside and probably the inside surfaces of the starch granules by adhesion only and there is no true affinity between the color material and starch. When the colored material is sprinkled on the oleomargarine or butter, the starch having greater affinity for the water present, will absorb the water, swell, and dislodge the colored matter which is not soluble in water. The color material has affinity for oil or fat, hence, it leaves the starch and combines with the oil or fat. In other words, the starch granules will dislodge themselves of the color matter and will not be visible in the oleomargarine thereafter.

I claim:

1. A dry coloring material for oleomargarine and the like consisting of water soluble granules coated and impregnated with a dry coloring matter.

2. A dry coloring material for oleomargarine and the like consisting of finely divided water soluble particles coated and impregnated with a suitable color.

3. The method of making a coloring material for oleomargarine and butter which consists in dissolving a dyestuff in a volatile solvent carrier, absorbing the colored solution with porous material and evaporating off the solvent.

4. The method of making a coloring material for oleomargarine and butter which consists in dissolving a dyestuff in a volatile solvent carrier, depositing the dyestuff on porous material and evaporating the solvent.

5. The method of making a coloring material for oleomargarine and butter which consists in dissolving a dyestuff in a volatile solvent carrier, depositing the dyestuff on finely divided absorbent material and removing the solvent.

JACOB SCHAUB.